(No Model.)

B. A. WASHBURN.
WHEEL RIM.

No. 583,961. Patented June 8, 1897.

Witnesses:
Geo. W. Finny
B. H. Roloff

Inventor:
Benton A. Washburn
By H. G. Underwood
Attorneys

THE NORRIS PETERS CO., PHOTO-LITHO., WASHINGTON, D. C.

UNITED STATES PATENT OFFICE.

BURTON A. WASHBURN, OF MILWAUKEE, WISCONSIN.

WHEEL-RIM.

SPECIFICATION forming part of Letters Patent No. 583,961, dated June 8, 1897.

Application filed June 15, 1896. Serial No. 595,605. (No model.)

*To all whom it may concern:*

Be it known that I, BURTON A. WASHBURN, a citizen of the United States, and a resident of Milwaukee, in the county of Milwaukee and State of Wisconsin, have invented certain new and useful Improvements in Wheel-Rims; and I do hereby declare that the following is a full, clear, and exact description thereof.

My invention relates especially to the production of an improved joint for wood rims of bicycle and other wheels; and it consists in certain peculiarities of construction, as will be fully set forth hereinafter and subsequently claimed.

Figure 1:
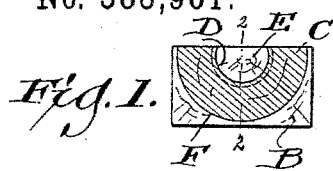
Figure 2:
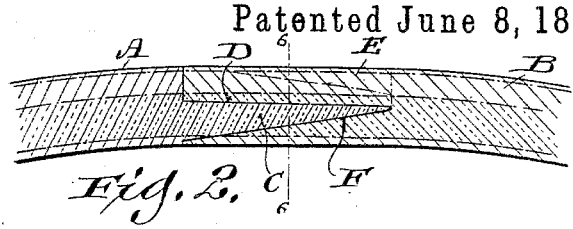
Figure 3:
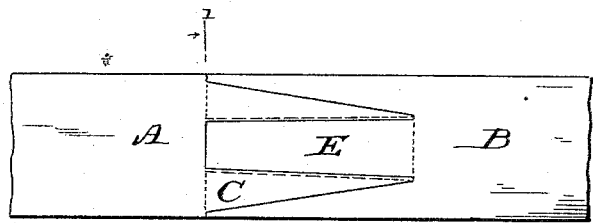
Figure 4:
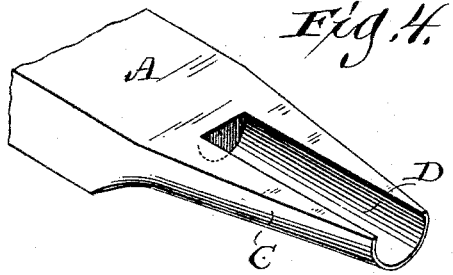
Figure 5:
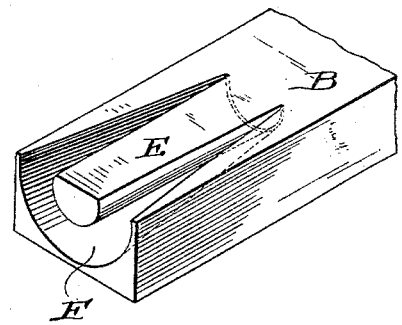
Figure 6:
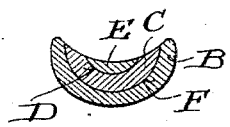
Figure 7:
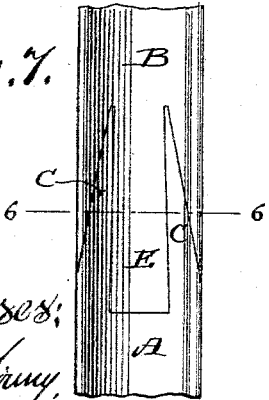

In the drawings, Figure 1 is a section through the meeting ends of a rim on the line 1 1 of Fig. 3 before said rim has been grooved and shaped. Fig. 2 is a longitudinal sectional view of the same parts. Fig. 3 is an outside view of the same parts. Figs. 4 and 5 are perspective views of the opposing ends of the said joint separated. Fig. 6 is a transverse sectional view through the joint after the rim has been grooved and shaped, taken on the line 6 6 of Fig. 7 and at the point indicated by the line 6 6 of Fig. 2. Fig. 7 is an outer view, and Fig. 8 an inner view, of the said joint or meeting ends in the grooved and shaped condition of the rim.

The object of my present invention is to obviate some of the defects incident to the well-known finger-joint construction of wood rims, consisting, essentially, of a series or multiplicity of long narrow interfitting tongues and grooves glued together and extending longitudinally of the rim and in the plane of the wheel, as I have found in practice that this style of joint is objectionable from the tendency of the fingers or tongues to slip or break away from their original position within the grooves under strain or pressure, they being merely held therein by glue, and hence I have entirely done away with this style of joint, a further objection to which was the tendency for moisture to work in and loosen and injure the joint, and to the end of remedying all these defects I have devised my present joint, which I will now proceed to describe.

Figure 8:
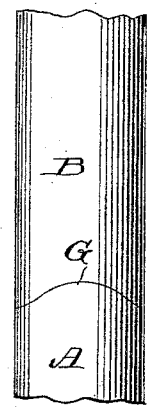

Referring to the drawings, A represents one of the meeting ends, and B the other, it being understood that my rims may be made of one or more pieces, just as preferred, this having nothing to do with the construction of the joint. The end A (which is best shown in Fig. 4 before grooving and shaping of the completed rim) has a projecting hollow cone-section C, the bore D of said section being likewise conically tapered in the reverse direction. The end B is formed with a projecting cone-section E to fit within the bore D of the end A, and beneath this part E with a conically-tapered bore F (the taper extending in the reverse direction to that of the cone-section E) for the reception of the described cone-section C of the end A. When the two meeting ends are put together, as shown in Figs. 2 and 3, and glued, the rim, when intended for bicycle and analogous wheels, is grooved and shaped as shown in Figs. 6 to 8, the consequent reduction and change in form of the completed rim caused thereby being indicated (on the central longitudinal line) by the longitudinal dotted lines and the differences in the oblique section-lines in Fig. 2, the joint coming to a feather-edge on the inner side of the rim, as indicated by the line G in Fig. 8, which holds much better with glue than a butt-joint would.

Having thus described my invention, what I claim as new, and desire to secure by Letters Patent, is—

In a wheel-rim joint, a pair of united meeting ends, one end having a projecting hollow cone-section, the bore of said section being likewise conically tapered, but in a reverse direction, and the other end having a projecting cone-section fitting within the bore of the cone-section of the first-named end, and formed with a conically-tapered bore, beneath its cone-section, having its taper extending in a reverse direction thereto, for the reception of the described cone-section of the said first-named meeting end, substantially as set forth.

In testimony that I claim the foregoing I have hereunto set my hand, at Milwaukee, in the county of Milwaukee and State of Wisconsin, in the presence of two witnesses.

BURTON A. WASHBURN.

Witnesses:
H. G. UNDERWOOD,
B. C. ROLOFF.